US005911855A

United States Patent [19]

Dransmann et al.

[11] Patent Number: 5,911,855

[45] Date of Patent: Jun. 15, 1999

[54] PRINTING MATERIAL FOR INK-JET PRINTING METHODS

[75] Inventors: Gerhard Dransmann, Osnabrück; Claudia Jünger, Ostercappeln; Horst Westfal, Belm, all of Germany

[73] Assignee: Felix Schoeller jr. Foto-und Spezialpapeire GmbH & Co. KG, Osnabruck, Germany

[21] Appl. No.: 08/852,579

[22] Filed: May 7, 1997

[30] Foreign Application Priority Data

May 9, 1996 [DE] Germany ........................... 196 18 607

[51] Int. Cl.[6] ................................ B41M 5/00; B32B 7/02

[52] U.S. Cl. .......................... 162/135; 428/212; 428/195; 428/206; 428/328

[58] Field of Search .................................... 162/135, 134, 162/136, 137; 428/211, 216, 195, 204, 206, 207, 212, 215, 213, 326, 304.4, 328, 329, 331, 340, 341, 342; 442/66, 67, 68, 69, 70, 71, 72, 73, 74, 75

[56] References Cited

U.S. PATENT DOCUMENTS

| | | | |
|---|---|---|---|
| 4,460,637 | 7/1984 | Miyamoto et al. | 428/212 |
| 4,576,867 | 3/1986 | Miyamoto | 428/342 |
| 4,620,197 | 10/1986 | Miyamoto et al. | 346/1.1 |
| 4,879,166 | 11/1989 | Misuda et al. | 428/212 |
| 5,171,626 | 12/1992 | Nagamine et al. | 428/212 |
| 5,185,213 | 2/1993 | Fujita et al. | 428/500 |
| 5,264,275 | 11/1993 | Misuda et al. | 428/304.4 |
| 5,518,821 | 5/1996 | Sasaki et al. | 428/500 |
| 5,683,784 | 11/1997 | Nakao et al. | 428/195 |
| 5,707,716 | 1/1998 | Yoshino et al. | 428/212 |

FOREIGN PATENT DOCUMENTS

| | | |
|---|---|---|
| 298424 | 1/1989 | European Pat. Off. . |
| 331125 | 9/1989 | European Pat. Off. . |
| 450540 | 10/1991 | European Pat. Off. . |
| 634287 | 1/1995 | European Pat. Off. . |
| 655346 | 5/1995 | European Pat. Off. . |
| 704315 | 4/1996 | European Pat. Off. . |
| 732219 | 9/1996 | European Pat. Off. . |
| 803374 | 10/1997 | European Pat. Off. . |

*Primary Examiner*—Stanley S. Silverman
*Assistant Examiner*—José A. Fortuna
*Attorney, Agent, or Firm*—Lockwood, Alex, FitzGibbon & Cummings

[57] ABSTRACT

A printing material for ink-jet printing methods has a support and a dye-receiving coating, and an upper coating which includes finely divided particles of an inorganic pigment and/or filler exhibiting cationic charge centers is disposed on the dye-receiving coating.

12 Claims, No Drawings

PRINTING MATERIAL FOR INK-JET PRINTING METHODS

The invention relates to a printing material for the ink-jet printing method.

The technology for producing color print-outs has in recent years gained much in significance in conjunction with the overall expansion of the electronic media. The goal of this technology is the adaptation of the image quality of the color print-outs to the level of silver-salt photography.

There are in existence various drawing systems, like the thermal ink-transfer system (dye-diffusion thermal transfer), the ink-jet method, or electrophotography.

In the ink-jet method, droplets of a printing medium (ink) are applied to the surface of the printing material by means of various techniques. For the generation of the drops there are basically two versions of the method. In the continuous process, a jet of ink is expelled from the nozzle and, due to surface tension, resolves into microscopically small drops. The drops are electrically charged and positioned on the stock or diverted into a reservoir by downstream diversion plates, which are controlled by the digital signals.

In what is called the drop-on-demand method, the picture signal triggers a mechanical pulse that expels the drops The first drop-on-demand printers employed the piezo-electric effect to effect the expulsion of the drops. Today, the method has been extensively replaced by the thermal ink jet, also called bubble jet. Here, the picture signal activates a heating element, whereby a vapor bubble occurs in the aqueous ink. The resulting vapor pressure expels the drops.

High demands are made of the ink-jet image-reception materials. The picture generated by ink-jet methods should have at its disposal high resolution, high color density, sufficient color gradations, good smudge fastness, good water fastness, good wet rub off fastness.

To achieve this, the following basic conditions must be fulfilled:

the ink must be rapidly absorbed by the printing material, the sprayed-out droplets of ink must separate in as exact a way as possible (round)

the ink diffusion in the printing material must not be too high, so that the diameter of the dots of ink will not be enlarged more than absolutely necessary, an ink dot should not, in the event of its overlapping a previously applied dot, impair it or wipe it out, the printing material must exhibit a surface that enables a high visual-reflection density and a high brilliance on the part of the colors, the printing material must exhibit a high dimensional stability without stretching subsequent to the printing procedure.

It is to some extent here a matter of conflicting demands. Too rapid engagement of smudge fastness for example signifies that the ink drops will separate only a little if at all, and the clarity of the emerging picture will accordingly be placed at a disadvantage.

The increasing improvement in the output capacity of ink-jet printing devices, which allow high printing speeds, has an aggravating effect on the fulfillment of the aforementioned demands.

The printing material (picture-reception material) employed for such drawing systems consists generally of a base and an ink-receiving coating, optionally as well as further auxiliary coatings. The support can for example be a polyester resin, diacetate, or paper.

With respect to the ink-receiving coatings, it is usually a matter of hydrophilic coatings, which are especially good for the adsorption of aqueous inks. The ink receiving coatings consist as a rule of a mixture of pigment and binder. The pigments serve, in addition to increasing the material's brightness, to retain the colors obtained from the drawing liquid against the surface of the sheet. Employed as binders are natural or synthetic polymers, gelatin, starches, pectin, casein, carboxymethyl cellulose, polyvinyl alcohol, polyvinylpyrrolidone (PVP), and the like. Often employed in addition in the ink-receiving coating are cationic substances, to fix the ink colors.

Often, printing materials of which the support is a paper and the ink-receiving coating contains a water-soluble binder tend to such problems as insufficient water fastness or cockling of the material. Thus, a printing material is known from Japanese Published Application JP 61-041585 that exhibits a mixture of polyvinyl alcohol and PVP and is distinguished by, in addition to the aforementioned lacking water fastness, a poor wet rub off fastness.

Good water fastness ought to be obtainable by a coating wherein, in addition to a vinyl polymer, a (meth)acrylic polymer and water-soluble cellulose compounds are contained (EP 0 672 537). A drawback of this printing material is its unsatisfactory drying time.

Known from Japanese Published Application JP 06-297831 is a printing material which exhibits a porous coating with a mixture of pseudoboehmite and polyvinyl alcohol. Thereby achieved are rapid drying times. What must be considered a drawback, however, are the high coating-application quantities (35–45 $g/m^2$) necessary for the rapid adsorption of even greater quantities of ink.

Until now, accordingly, no printing material is known that fulfills all these demands in a satisfactory way.

The object of the present invention is accordingly to make available a printing material that does not exhibit the aforementioned drawbacks but possesses good water fastness and a very high resolution and color density.

This object is attained by means of a printing material including a support and a receiving coating, whereby an upper coating which includes a finely porous inorganic pigment exhibiting cationic charge centers is disposed on the receiving coating.

Particularly appropriate for this purpose are aluminum oxides, pyrogenic aluminum hydroxides, and aluminum-oxide hydrates, but especially the α-aluminum oxide monohydrate or the metahydroxide γ-AlO(OH)(Boehmite) with a pore radii distribution of 10 to 35 Å. In one particular embodiment of the invention a finely divided silicic acid like pyrogenic silicic acid can be introduced into the upper coating. The quantity of the finely divided silicic acid can vary between 30 and 70 weight % in terms of the total quantity of pigment.

In one preferred embodiment of the invention a polyvinyl alcohol is included as a binder in the upper coating. Particularly appropriate is a partly saponified polyvinyl alcohol with a saponification degree between 70 and 90 molar %. Also appropriate are cationically modified binders like for example a cationic polyvinyl alcohol or cationically modified starch. Other water-soluble polymers, however, can also be employed as binders. The quantity of the binder can amount to 20 to 90 weight %. Preferred is the quantity range 40 to 90 weight %, but especially 50 to 80 weight % (in terms of the dried coating).

The quantitative ratio of the inorganic particles of pigment and/or filler to the binder can amount to 1:0.4 to 1:100, preferably, however, to 1:2 to 1:100.

In one particular embodiment of the invention, the upper coating additionally includes at least one cationic polymer such as for example a cationically modified polyvinyl alcohol, a cationically modified starch, a cationically modified polystyrene, a cationically modified PVP, and similar polymers. Particularly appropriate are quaternary, hydroxy- or aminofunctional acrylate-homo- and/or acrylate-copolymers. The quantity of the cationic polymer amounts to 1 to 30 weight %, especially 5 to 20 weight %, in terms of the dried coating. Along with the aforementioned cationic polymers, the upper coating can include an additional cationic dye-fixing agents, for example a quaternary polyammonium salt from the group of the polyvinylbenzyltrimethyl, polydiallyldimethyl, polymethacryloxyethyldimethylhydroxyethyl, and polyhydroxypropyldimethyl ammonium chlorides. But other dye-fixing agents like cationic polyamines, cationic polyacrylamides, cationic polyethylene amines, can be employed. The quantity of the dye-fixing agents can amount up to 5 weight %, especially 0.5 to 3 weight %.

The ink-receiving coating can include binders, dye-fixing compounds, hardeners, and other auxiliaries. Polyvinyl alcohol, modified polyvinyl alcohol, cationically modified polystyrene, carboxymethylcellulose, PVP, polyvinyl acetate, starch, gelatin, or mixtures thereof can be employed as binders. In one preferred embodiment of the invention, gelatin is employed in the ink-receiving coating. Proven to be especially appropriate is a pigskin gelatin with a gelatin strength of 200–300 Bloom (measured in accordance with BS 757, 1975), but a beef-bone gelatin can also be employed. In another embodiment of the invention up to 20 weight % (in terms of the overall binders) of another binder can additionally be included. In relation to the additional binder it is a matter of a modified polyvinyl alcohol, carboxymethylcellulose, or polyvinylpyrrolidone. Especially good results are obtained when, along with the binder and the dye-fixing agents, which can be employed in a quantity up to 5 weight %, a cationic polymer is employed. The cationic polymer can be a quaternary hydroxy- or aminofunctional acrylate-homo- and/or acrylate copolymer. But other cationic polymers like for example a cationic polystyrene or a cationically modified starch can also be employed. The quantitative ratio of the cationic polymer to the binder in the receiving coating amounts to 1:2 to 1:20.

In the printing material in accordance with the invention, a sheet (film) of plastic or preferably an uncoated or coated base paper can be employed as a support. Particularly appropriate is a paper coated on each side with artificial resin with an area weight of 50 to 250 g/m$^2$. Polyolefins or polyesters for example can be employed as artificial resin. The application quantity of the artificial-resin coating, wherein pigments, colors, and other auxiliaries can be included, amounts to at least 5 g/m$^2$. In one specific embodiment of the invention a polyethylene-coated paper is employed. Also appropriate as a support, however, is a brush-coated paper, especially a barite-coated paper.

The back side of the printing material can also exhibit a function coating, especially an anticurl and or antistatic coating.

Not only the ink-receiving but also the upper coating are applied from an aqueous dispersion (coating mass) and dried. The coating mass can be applied to the support by any conventional application or metering method like for example roller-application, engraving or nip methods and air brushes or metering-knife.

The application quantity of the ink-receiving coating amounts to 1.0 to 20 g/m$^2$, preferably 8 to 14 g/m$^2$. The application quantity of the upper coating amounts to 0.5 to 5.0 g/m$^2$, preferably 1.0 to 4.0 g/m$^2$.

Represented in the following Tables 1 and 2 are some of the many possible embodiment of the invention.

TABLE 1

| Components of ink-receiving coating A | A1 | A2 | A3 | A4 | A5 | A6 | A7 |
|---|---|---|---|---|---|---|---|
| Gelatin, 264 Bloom | 91.8 | 81.8 | 73.6 | 73.4 | 82.6 | — | — |
| Polyvinyl alcohol, Saponification degree: 98 molar % | — | — | 8.2 | — | 9.2 | 31.6 | 41.0 |
| Polyvinylpyrrolidone, Molecular weight: 630 000 daltons | — | — | — | 18.4 | — | 31.6 | 41.0 |
| Vinyl-acetate/butyl-acrylate copolymer | — | — | — | — | — | 31.6 | — |
| Aminomethyl methacrylate | 5.0 | 15.0 | 15.0 | 5.0 | 5.0 | — | 15.0 |
| Quaternary poly-ammonium salt | 3.0 | 3.0 | 3.0 | 3.0 | 3.0 | 5.2 | 3.0 |
| TAF/formaldehyde | 0.2 | 0.2 | 0.2 | 0.2 | 0.2 | — | — |

TABLE 2

| Components of upper coating B | B1 | B2 | B3 | B4 | B5 | B6 | B7 | B8 | B9 | B10 |
|---|---|---|---|---|---|---|---|---|---|---|
| Polyvinyl alcohol, saponification degree: 88 molar % | 65 | — | — | — | 80 | — | — | — | 36 | — |
| Polyvinyl alcohol, saponification degree 74 molar % | — | 75 | — | — | — | 62 | 72 | 65 | 36 | — |
| Cationic polyvinyl alcohol | — | — | 65 | — | — | — | — | — | — | 72 |
| Polyvinylpyrrolidone | — | — | — | 65 | — | — | — | — | — | — |
| Al hydroxide, 10–30 Å | — | — | — | 30 | — | — | — | — | — | — |
| Boehmite, 10–35 Å | 30 | 20 | 30 | — | 15 | 20 | 20 | 10 | 10 | 20 |
| Silicic acid | — | — | — | — | — | — | — | 10 | — | — |
| Aminomethylmethacrylate | — | — | — | — | — | 15 | — | 10 | — | 5 |
| Hydroxyacrylate terpolymer | — | — | — | — | — | — | 5 | — | 15 | — |
| Quaternary poly- ammonium salt | 5 | 5 | 5 | 5 | 5 | 3 | 3 | 5 | 3 | 3 |

The quantity statements are expressed in weight % and relate to dried coatings.

The invention will now be specified with the assistance of a few selected examples.

EXAMPLE 1

The front of a base coated with an area weight of 19 g/m$^2$ of an LDPE (low density polyethylene), was neutrally sized with alkylketene dimer and coated on both sides with polyethylene with an area weight of 80 g/m$^2$ was first provided with an ink-receiving coating in accordance with A1 (Tab. 1) and then with an upper coating in accordance with B1, B2, B6, B7, and B8 (Tab. 2). Initially produced for this purpose was a corresponding aqueous coating mass, which was then applied by means of a metering knife to the supporting material to be coated and dried. The application weights amounted to

| | | | Standard wire-blade/size |
|---|---|---|---|
| Ink-receiving coating: | | 10 g/m$^2$ | 100 |
| Upper coating | B1: | 2 g/m$^2$ | 35 |
| | B2: | 3 g/m$^2$ | 40 |
| | B6: | 4 g/m$^2$ | 45 |
| | B7: | 4 g/m$^2$ | 45 |
| | B8: | 4 g/m$^2$ | 45 |

Examples

| 1.1 | 1.2 | 1.3 | 1.4 | 1.5 |
|---|---|---|---|---|
| A1 + B1 | A1 + B2 | A1 + B6 | A1 + B7 | A1 + B8 |

Other test conditions:

| | |
|---|---|
| Machine speed: | 100 m/min |
| Drying temperature (air): | 100° C. |
| Drying time: | 2–4 min |

The coating also included:

0.95 weight % optical brightener 10 weight % titanium dioxide 4 weight % lubricant 10.8 weight % of a pigment concentrate (10 % ultramarine, 90% LDPE)

The back of the base paper was coated with a mixture of LDPE and HDPE (high-density polyethylene). The application weight amounted to 20 g/m$^2$.

The resulting printing material was printed in what is called the thermal-jet method and subsequently analyzed.

The results of the test are summarized in Table 3.

EXAMPLE 2

The front of the base paper from Example 1 was first provided with a ink-receiving coating in accordance with A2 (Table 1) and then with an upper coating in accordance with B2, B6, and B8 (Tab. 2). The application weights amounted to:

| | | |
|---|---|---|
| Ink-receiving coating: | | 12 g/m$^2$ |
| Upper coating | B2: | 4 g/m$^2$ |
| | B6: | 5 g/m$^2$ |
| | B8: | 2 g/m$^2$ |

Examples

| 2.1 | 2.2 | 2.3 |
|---|---|---|
| A2 + B2 | A2 + B6 | A2 + B8 |

The test conditions were the same as for Example 1.

The test results are summarized in Table 3.

EXAMPLE 3

A base paper provided on the front with a coating of barite (basis weight: 80 g/m$^2$) was first provided with a ink-receiving coating in accordance with A7 and then with an upper coating in accordance with B9.

The barite coating included 85 weight % $BaSO_4$ and 15 weight % gelatin.

The test conditions were the same as for Example 1.

The test results are summarized in Table 3.

Reference Example R1

The base paper from Example 1 was coated with an ink-receiving coating in accordance with A2 (12 g/m$^2$) and then with an upper coating in accordance with B6 (4 g/m$^2$), without, however, Boehmite with a narrow pore radii distribution, but instead with aluminum hydroxide with a pore radii distribution of 28 to 1000 Å (R1a) and 20 to 140 Å (R1b).

Reference Example R2

The base paper from Example 1 was coated only with an ink-receiving coating in accordance with A2 and A6 without and with the addition of aluminum hydroxide.

| Components | R2a | R2b | R2c |
|---|---|---|---|
| Gelatin, 264 Bloom | 81.8 | — | — |
| Polyvinyl alcohol, Saponification degree: 98 molar % | — | 31.60 | 21.60 |
| Polyvinylpyrrolidone, Molecular weight: 630 000 daltons | — | 31.60 | 21.60 |
| Vinyl-acetate/butyl-acrylate copolymer | — | 31.60 | 21.60 |
| Aminomethylmethacrylate | 15.00 | — | — |
| Quaternary poly-ammonium salt | 3.00 | 5.20 | 5.20 |
| Aluminum hydroxide, 20–140 Å | — | — | 30.00 |
| TAF/formaldehyde | 0.20 | — | — |
| Application, g/m$^2$ | 15 | 15 | 15 |

The quantity statements are in weight % and relate to dried layers.

Reference Example R3

A commercially available printing material, Folex Folie BG-32 WO, was employed as a reference.

The printing material obtained in the reference examples was printed in what is called the thermal-jet method and subsequently analyzed. The result are summarized in Table 4.

Testing the printing material obtained in accordance with the examples and reference examples The printing material was printed by means of an HP Deskjet 550 C of the firm of Hewlett Packard and operating on the bubble-jet (thermal-jet) principle.

In the resulting printed images, color density, water fastness, drying time, brightness, and bleed were investigated.

The density measurements were carried out by means of an Original SOS-45 reflection densitometer. The measurements were carried out with respect to the primary fundamental colors cyan, magenta, yellow, and black.

For the investigation of water fastness the printing material was immersed in water. The density (%) remaining subsequent to 60 s in the water bath at 25° C. was employed as a measure of water stability.

The running together of the inks at the margins of adjacent areas of color (bleed) was evaluated visually with the grades 1–6 (very good to very bad).

The measurement of brightness occurred with the RL3 laboratory reflectometer of the firm of Dr. Lange in accordance with DIN 67 530.

The drying behavior of the printing material was determined as follows:

A bar was printed out on a sheet of paper with black ink (pure black) and, subsequent to a waiting time of 120 seconds, paper (20 sheets) applied. The color transfer was taken as a measure of drying. The drying time can amount to <120, 120–240, and >240 seconds.

As will be evident from the tables, the printing materials produced in accordance with the invention are distinguished by better water fastness, shorter drying times, and better bleed behavior. Even though the water fastnesses and drying times of the papers produced in accordance with R1a and R1b are likewise good, still the bleed behavior is unsatisfactory. With respect to brightness, too, the values for Example 2.2 are higher than those of the corresponding reference examples R1a and R1b.

TABLE 3

Test results - Examples 1 to 3

| Example | Color density cyan | magenta | yellow | black | Water fastness % | Drying time, sec | Brightness | Bleed Grade |
|---|---|---|---|---|---|---|---|---|
| 1.1 | 1.8 | 1.8 | 1.6 | 2.0 | 97 | 180 | 78 | 1 |
| 1.2 | 2.0 | 1.9 | 1.8 | 2.1 | 92 | 160 | 81 | 2 |
| 1.3 | 2.1 | 2.2 | 1.7 | 2.2 | 98 | 130 | 80 | 1 |
| 1.4 | 1.9 | 1.9 | 1.8 | 2.0 | 94 | 170 | 83 | 2 |
| 1.5 | 1.8 | 2.0 | 1.9 | 1.7 | 90 | 180 | 35 | 2 |
| 2.1 | 1.9 | 1.8 | 1.7 | 2.0 | 95 | 140 | 80 | 1 |
| 2.2 | 2.0 | 2.3 | 1.9 | 2.3 | 100 | <120 | 81 | 1 |
| 2.3 | 1.8 | 1.9 | 1.9 | 1.9 | 92 | 180 | 62 | 2 |
| 3 | 1.8 | 1.6 | 1.5 | 1.7 | 100 | <120 | 50 | 2 |

TABLE 4

Test results - Reference Examples R1 to R3

| Example | Color density cyan | magenta | yellow | black | Water fastness % | Drying time, sec | Brightness | Bleed Grade |
|---|---|---|---|---|---|---|---|---|
| R1a | 1.7 | 1.6 | 1.6 | 1.7 | 96 | 120 | 29 | 3 |
| R1b | 1.9 | 2.1 | 1.8 | 2.2 | 96 | 140 | 70 | 2 |
| R2a | 1.6 | 1.6 | 1.6 | 2.0 | 35 | >240 | 80 | 3 |
| R2b | 1.4 | 1.6 | 1.6 | 1.8 | 35 | >240 | 80 | 4 |
| R2c | 1.5 | 1.7 | 1.6 | 1.7 | 80 | 210 | 58 | 3 |
| R3 | 1.6 | 1.5 | 1.6 | 1.7 | 42 | >240 | 68 | 3 |

We claim:

1. A printing material for ink-jet printing comprising a support, a dye receiving coating which is substantially free of pigments and/or fillers, and an upper coating disposed on the dye-receiving coating and which includes finely divided particles of an inorganic pigment and/or filler in the amount of about 20–90 weight % of the coating, said finely divided particles exhibiting cationic charge centers and having a pore radii distribution of 10–35Å.

2. A printing material as claimed in claim 1, wherein the particles of inorganic pigment and/or filler are an aluminum hydroxide.

3. A printing material as claimed in claim 2, wherein the aluminum hydroxide is a Boehmite.

4. A printing material as claimed in claim 1, wherein the particles of inorganic pigment and/or filler are a pyrogenic aluminum oxide.

5. A printing material as claimed in claim 1, wherein the upper coating includes at least one cationic polymer.

6. A printing material as claimed in claim 5, wherein the quantity of the cationic polymer in the upper coating amounts to 1 to 30 weight % of the coating.

7. A printing material as claimed in claim 1, wherein the upper coating includes dye-fixing agents in a quantity of 0.5 to 3.0 weight %.

8. A printing material as claimed in claim 1, wherein the ink-receiving coating includes a dye-fixing agent in the amount of 0.5 to 5.0 weight % of the coating.

9. A printing material as claimed in claim 1, wherein the support is a polyolefin-coated paper.

10. A printing material as claimed in claim 1, wherein the support is a barite-coated paper.

11. A printing material as claimed in claim 5, wherein the quantity of the cationic polymer in the upper coating amounts to 5 to 20 weight % of the coating.

12. The printing material as claimed in claim 1, wherein the finely divided inorganic particles in the upper coating are bound by a binder, and the ratio of the finely divided inorganic particles to the binder is about 1:2 to 1:100.

* * * * *

UNITED STATES PATENT AND TRADEMARK OFFICE

CERTIFICATE OF CORRECTION

PATENT NO. : 5,911,855
DATED : June 15, 1999
INVENTOR(S) : Gerhard Dransmann et al.

It is certified that error appears in the above-identified patent and that said Letters Patent is hereby corrected as shown below:

Column 1,
Line 24, after "drops" insert a period -- . --.

Column 8,
Line 27, after "%" insert -- of the coating --.

Signed and Sealed this

Sixth Day of November, 2001

*Attest:*

Nicholas P. Godici

NICHOLAS P. GODICI

*Attesting Officer* *Acting Director of the United States Patent and Trademark Office*